(12) United States Patent
Ma et al.

(10) Patent No.: US 12,187,636 B2
(45) Date of Patent: Jan. 7, 2025

(54) ANTI-FOG GLASS, VEHICLE AND METHOD OF MANUFACTURING THE ANTI-FOG GLASS

(71) Applicant: SAINT-GOBAIN GLASS FRANCE, Courbevoie (FR)

(72) Inventors: Siteng Ma, Shanghai (CN); Li Ferrieres-Zhao, Shanghai (CN); He He, Shanghai (CN); Xiaotong Gao, Shanghai (CN); Daming Li, Shanghai (CN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/919,447

(22) PCT Filed: Apr. 30, 2021

(86) PCT No.: PCT/CN2021/091442
§ 371 (c)(1),
(2) Date: Oct. 17, 2022

(87) PCT Pub. No.: WO2021/219128
PCT Pub. Date: Nov. 4, 2021

(65) Prior Publication Data
US 2023/0174421 A1    Jun. 8, 2023

(30) Foreign Application Priority Data

Apr. 30, 2020    (CN) .......................... 202010363769.5

(51) Int. Cl.
*B32B 15/04*    (2006.01)
*B32B 17/06*    (2006.01)
(Continued)

(52) U.S. Cl.
CPC ........ *C03C 17/3673* (2013.01); *C03C 17/007* (2013.01); *C03C 17/3642* (2013.01);
(Continued)

(58) Field of Classification Search
CPC .................................. C03C 17/3673
(Continued)

(56) References Cited

U.S. PATENT DOCUMENTS 5,620,799 A * 4/1997 Sauer .................. H01Q 1/1271
  52/173.3
5,867,129 A * 2/1999 Sauer ................ B32B 17/10036
  343/704
(Continued)

FOREIGN PATENT DOCUMENTS

CN    104817858 A    8/2015
CN    205224993 U    5/2016
(Continued)

OTHER PUBLICATIONS

International Search Report as issued in International Patent Application No. PCT/CN2021/091442, dated Jul. 26, 2021.

*Primary Examiner* — Lauren R Colgan
(74) *Attorney, Agent, or Firm* — Pillsbury Winthrop Shaw Pittman LLP (57) ABSTRACT

An anti-fog glass includes a glass body configured as a single layer or a multilayer stack; an active anti-fog layer disposed on the glass body and heating up when being provided with power; and a passive anti-fog layer disposed on the glass body and inhibiting fog from forming on the passive anti-fog layer. The passive anti-fog layer is a super hydrophobic coating and/or hydrophilic coating. Both the active anti-fog layer and the passive anti-fog layer are simultaneously disposed on the glass body to inhibit fog from forming. In this way, in a region of the glass body not (Continued)

covered by the active anti-fog layer, the anti-fog function is achieved by the passive anti-fog layer to a certain degree; in addition, in a region where the passive anti-fog layer itself cannot provide a desired anti-fog level, the active anti-fog layer together with the passive anti-fog layer provide a better anti-fog effect.

22 Claims, 7 Drawing Sheets

(51) Int. Cl.
   *C03C 17/00*     (2006.01)
   *C03C 17/36*     (2006.01)
(52) U.S. Cl.
   CPC ...... *C03C 17/3644* (2013.01); *C03C 2217/21* (2013.01); *C03C 2217/29* (2013.01); *C03C 2217/478* (2013.01); *C03C 2217/71* (2013.01); *C03C 2218/11* (2013.01)
(58) Field of Classification Search
   USPC .................................................. 428/428, 432
   See application file for complete search history.

(56) References Cited

U.S. PATENT DOCUMENTS

| | | | | |
|---|---|---|---|---|
| 6,515,631 | B1* | 2/2003 | Nakamura | C03C 17/3681 |
| | | | | 427/163.1 |
| 8,372,484 | B2* | 2/2013 | He | C09D 133/08 |
| | | | | 427/372.2 |
| 10,960,646 | B2* | 3/2021 | Kagaya | B32B 7/12 |
| 11,117,450 | B2* | 9/2021 | Irie | B32B 17/10165 |
| 11,422,294 | B2* | 8/2022 | Bard | G02B 5/208 |
| 2001/0030808 | A1* | 10/2001 | Komatsu | C03C 17/3417 |
| | | | | 359/507 |
| 2002/0037402 | A1* | 3/2002 | Yamazaki | C03C 17/007 |
| | | | | 428/447 |
| 2003/0152763 | A1* | 8/2003 | Zhang | C03C 17/007 |
| | | | | 428/426 |
| 2004/0137155 | A1* | 7/2004 | Bernheim | C03C 17/322 |
| | | | | 528/65 |
| 2007/0020465 | A1* | 1/2007 | Thiel | C03C 17/3673 |
| | | | | 428/428 |
| 2009/0098354 | A1* | 4/2009 | Torr | B32B 17/1011 |
| | | | | 428/215 |
| 2009/0239017 | A1* | 9/2009 | Ishioka | B32B 17/10761 |
| | | | | 427/163.1 |
| 2010/0101649 | A1* | 4/2010 | Huignard | B32B 17/10036 |
| | | | | 427/373 |
| 2010/0230991 | A1* | 9/2010 | Fioravanti | B60S 1/481 |
| | | | | 296/96.15 |
| 2011/0033663 | A1* | 2/2011 | Svec | C08F 220/1804 |
| | | | | 521/50 |
| 2014/0275374 | A1* | 9/2014 | Shi | C09D 183/02 |
| | | | | 524/556 |
| 2015/0232690 | A1* | 8/2015 | Armstrong | C09D 4/06 |
| | | | | 523/455 |
| 2018/0065883 | A1* | 3/2018 | Palmisano | C03C 17/2456 |
| 2018/0113331 | A1* | 4/2018 | Wang | G02F 1/0102 |
| 2018/0281568 | A1* | 10/2018 | Nakamura | B60J 1/00 |
| 2019/0023608 | A1* | 1/2019 | Brudieu | B60J 1/02 |
| 2020/0238797 | A1* | 7/2020 | Bard | G02B 1/111 |
| 2020/0310014 | A1* | 10/2020 | Bard | C03C 17/3655 |
| 2021/0162840 | A1* | 6/2021 | Miyamoto | B32B 17/10036 |
| 2021/0402854 | A1* | 12/2021 | Noda | G01K 1/14 |
| 2023/0174421 | A1* | 6/2023 | Ma | C03C 17/3642 |
| | | | | 428/432 |

FOREIGN PATENT DOCUMENTS

| | | | |
|---|---|---|---|
| CN | 208234789 U | | 12/2018 |
| JP | 2015-074588 A | | 4/2015 |
| WO | WO2020189353 | * | 9/2020 |

* cited by examiner

ANTI-FOG GLASS, VEHICLE AND METHOD OF MANUFACTURING THE ANTI-FOG GLASS

CROSS-REFERENCE TO RELATED APPLICATIONS

This application is the U.S. National Stage of PCT/CN2021/091442, filed Apr. 30, 2021, which in turn claims priority to Chinese patent application number 202010363769.5 filed Apr. 30, 2020. The content of these applications are incorporated herein by reference in their entireties.

FIELD

Embodiments of the present disclosure generally relate to the field of glass, and more particularly to an anti-fog glass, a vehicle comprising the anti-fog glass and a method of manufacturing the anti-fog glass.

BACKGROUND

Advanced Driving Assistance System (ADAS) uses various sensors mounted on a vehicle to sense the surrounding environment, collect data, and identify, detect and track static and dynamic objects at any time in the process of driving the vehicle, and perform systematic calculation and analysis in combination with navigator map data, thereby enabling the driver to perceive a danger that might occur in advance, and effectively increasing the comfort and safety in driving the vehicle.

The sensors used by the ADAS mainly include a camera, a laser radar (LiDAR), a millimeter wave radar and an ultrasonic radar. A key position for mounting these sensors is a windshield area. Among these sensors, the camera, thermal camera, LiDAR and the like require the windshield area to have higher optical quality to sense the surrounding environment through the windshield. However, in autumn and winter or regions with high humidity, factors such as temperature differences or high humidity will cause fog to form on the windshield, thereby affecting the sensing of the external environment by sensors such as the camera, thermal camera and LiDAR.

SUMMARY

An object of the present disclosure is to provide an anti-fog glass, a vehicle comprising the anti-fog glass and a method of manufacturing the anti-fog glass, to at least partially solve the above problems existing in the prior art.

According to a first aspect of the present disclosure, there is provided an anti-fog glass, comprising: a glass body being configured as a single layer or a multilayer stack; an active anti-fog layer being disposed on the glass body and configured to heat up when being provided with power; and a passive anti-fog layer being disposed on the glass body and configured to inhibit fog from forming on the passive anti-fog layer, wherein the passive anti-fog layer is a super hydrophobic coating and/or a hydrophilic coating.

In some embodiments, the active anti-fog layer is disposed on at least one surface of the glass body, and the passive anti-fog layer is disposed on at least one other surface of the glass body except for the at least one surface.

In some embodiments, the glass body comprises a first layer and a second layer stacked with each other, the first layer comprises a first surface and a second surface, the second layer comprises a third surface and a fourth surface, and the second surface faces towards the third surface; the active anti-fog layer is disposed on at least one of the second and third surfaces; and the passive anti-fog layer is disposed on at least one of the first and fourth surfaces.

In some embodiments, the first surface is provided with the hydrophilic coating and the fourth surface is provided with the super hydrophobic coating.

In some embodiments, the active anti-fog layer comprises at least one of: a transparent conductive film, a silver printed wire, a heating patch, a heating plate, a copper wire and a tungsten wire.

In some embodiments, the at least one surface of the glass body comprises a region where the active anti-fog layer is not formed, so as to allow infrared and radio signals to pass therethrough.

In some embodiments, at least one surface of the glass body is provided with both the active anti-fog layer and the passive anti-fog layer.

In some embodiments, the active anti-fog layer is disposed around the passive anti-fog layer on the at least one surface to allow infrared and radio signals to pass through the passive anti-fog layer.

In some embodiments, the glass body comprises a first layer and a second layer stacked with each other, the first layer comprises a first surface and a second surface, the second layer comprises a third surface and a fourth surface, and the second surface faces towards the third surface; and the first surface and/or the fourth surface is provided with both the active anti-fog layer and the passive anti-fog layer.

In some embodiments, the active anti-fog layer is a silver printed wire.

In some embodiments, the super hydrophobic coating comprises an inorganic oxide layer with a thickness of 0.1 $\mu$m to 20 $\mu$m, 30% to 90% of the volume of the inorganic oxide layer consists of pores with an aperture of 20 nm to 300 nm, the pores are evenly distributed throughout the thickness of the inorganic oxide layer, and almost all of the pores are in communication with each other, and inner and outer surfaces of the inorganic oxide layer are functionalized with a compound containing perfluoroalkyl or alkyl functional groups, and then saturated with a hydrophobic oil that impregnates the functionalized porous layer and forms a film on its surface.

In some embodiments, the hydrophilic coating is formed by a coating dispersant coated on the glass body, and based on the total weight of the hydrophilic coating, the hydrophilic coating contains: 0.1-50 wt % photocatalytic metal compound; 0-95 wt % particulate silica; and 0-50 wt % binder, wherein the photocatalytic metal compound comprises a photocatalytic metal sulfide, a photocatalytic metal oxide or a combination thereof.

In some embodiments, the photocatalytic metal compound is zinc oxide, zirconium oxide, tin oxide, titanium dioxide, zinc sulfide, lead sulfide, or a combination thereof, preferably titanium dioxide.

In some embodiments, a particle size of the photocatalytic metal compound is 10-100 nm.

In some embodiments, the hydrophilic coating contains particulate silica having a particle size of 10-30 nm.

In some embodiments, the binder is one or more selected from sol-type silica and silane coupling agent; preferably, the sol-type silica contains one or more of tetraethoxysilane, sodium silicate, lithium silicate, and potassium silicate; the silane coupling agent is prepared by organic silicate precursors having the following general formula or a combination thereof: R2nSi(OR1)4−n; wherein n is an integer of 0-2, R1 is a CXH2X+1 type alkyl functional group, and R2 is an organic group containing alkyl, epoxy, acrylate, methacrylate, amine, phenyl or vinyl functional group.

In some embodiments, the hydrophilic coating is formed by a coating dispersant coated on the glass body, and wherein the coating dispersant further comprises a dispersion medium, and the dispersion medium is an aqueous solution, a solution containing water, or water; and/or the pH of the coating dispersant is 1-7, preferably 2-5.

In some embodiments, the passive anti-fog layer is formed onto the glass body through at least one of: spray, wet coating, roller coating, slit coating, embossing, knife coating, impregnation, curtain coating, reverse roll coating, gravure coating, dip coating, and wire coating.

In some embodiments, the anti-fog glass is a glass for a vehicle.

According to a second aspect of the present disclosure, there is provided a vehicle comprising the anti-fog glass according to the first aspect.

According to a third aspect of the present disclosure, there is provided a method of manufacturing an anti-fog glass, comprising: providing a glass body being configured as a single layer or a multilayer stack; forming an active anti-fog layer on the glass body, the active anti-fog layer is configured to heat up when being provided with power; and forming a passive anti-fog layer on the glass body, the passive anti-fog layer is configured to inhibit fog from forming on the passive anti-fog layer, wherein the passive anti-fog layer is a super hydrophobic coating and/or a hydrophilic coating.

In embodiments of the present disclosure, both the active anti-fog layer and the passive anti-fog layer are simultaneously disposed on the glass body to prevent formation of the fog. In this way, in a region of the glass body not covered by the active anti-fog layer, the anti-fog function may be achieved by the passive anti-fog layer to a certain degree; in addition, in a region where the passive anti-fog layer itself cannot provide a desired anti-fog level, the active anti-fog layer together with the passive anti-fog layer can provide a better anti-fog effect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

DETAILED DESCRIPTION OF EMBODIMENTS

Preferred embodiments of the present disclosure will be described as follows in greater detail with reference to the drawings. Although preferred embodiments of the present disclosure are illustrated in the drawings, it is to be understood that the present disclosure described herein may be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others may denote different or identical objects.

As stated above, in autumn and winter or in regions with large humidity, factors such as temperature difference or large humidity cause fog to occur on the vehicle windshield, thereby affecting the sensing of the external environment by sensors such as the camera, thermal camera and LiDAR. The anti-fog glass according to embodiments of the present disclosure prevents formation of the fog by combining an active anti-fog layer and a passive anti-fog layer. Principles of the present disclosure will be described below in detail with reference to figures and in conjunction with exemplary embodiments.

Figure 1:
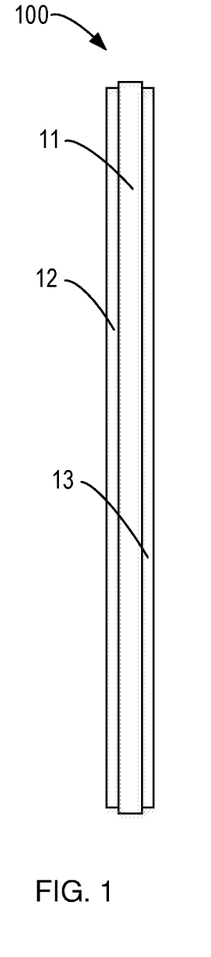
FIG. 1 illustrates a structural schematic diagram of a single-layered anti-fog glass according to an embodiment of the present disclosure.

FIG. 1 illustrates a structural schematic diagram of a single-layered anti-fog glass according to an embodiment of the present disclosure. As shown in FIG. 1, the anti-fog glass 100 described herein generally includes a glass body 11, an active anti-fog layer 12 and a passive anti-fog layer 13. The glass body 11 is single-layered. The active anti-fog layer 12 is disposed on one surface of the glass body 11 and can heat up when being provided with power. The heated active anti-fog layer 12 can increase the temperature of the glass body 11, thereby preventing the formation of fog on the glass body 11. The passive anti-fog layer 13 is disposed on the other surface of the glass body 11 and configured to inhibit fog from forming on the passive anti-fog layer 13. The passive anti-fog layer may be a super hydrophobic coating and/or a hydrophilic coating. The super hydrophobic coating can use repellence of the coating surface against the fog droplets to allow the fog droplets to gather into large water droplets which then automatically roll off the coating surface, thereby inhibiting fog from forming on the passive anti-fog layer 13. The hydrophilic coating can improve the surface tension of the coating surface, which can disperse fog and wet the coating surface, transform the fog droplets on the coating surface into a layer of uniform water film, and thereby inhibiting fog from forming on the passive anti-fog layer 13. The specific positions and exemplary recipes of the active anti-fog layer 12 and the passive anti-fog layer 13 will be described in detail below.

In some embodiments, the active anti-fog layer 12 and the passive anti-fog layer 13 may be simultaneously disposed on any one surface of the single-layered glass body 11. For example, the active anti-fog layer 12 may be disposed around the passive anti-fog layer 13 to allow infrared and radio signals to pass through the passive anti-fog layer 13. When the anti-fog glass 100 is used on a vehicle, the infrared and radio signals can pass through the passive anti-fog layer 13 without being interfered with or isolated by the active anti-fog layer 12, so that normal use of the following functions will not be affected: ETC, RFID, rain sensors, radios, infrared cameras, etc.

In an embodiment, the anti-fog glass 100 may be a vehicle glass, such as a vehicle window glass, a windshield, etc. In other embodiments, the anti-fog glass 100 may also be used for other purposes, such as a building glass, etc. The scope of the present disclosure is not limited in this respect.

In the vehicle glass, the active anti-fog layer 12 may be disposed either on an inner surface of the glass body 11 facing an interior of the vehicle or on an outer surface facing an exterior of the vehicle. Similarly, the passive anti-fog layer 13 may be disposed either on the inner surface of the glass body 11 facing the interior of the vehicle or on the outer surface of the glass body 11 facing the exterior of the vehicle. In some embodiments, when the active anti-fog layer 12 is a transparent conductive film that is not scratch-resistant, the active anti-fog layer 12 is disposed on the inner surface. Disposing the active anti-fog layer 12 on the inner surface may reduce scratches, thereby improving product durability.

In an embodiment, the active anti-fog layer 12 may be a silver printed wire. In other embodiments, the active anti-fog layer 12 may also be of other types, such as a heating patch, a heating plate, a copper wire and a tungsten wire. The scope of the present disclosure is not limited in this respect.

FIG. 2-5 illustrate a structural schematic diagram of a laminated anti-fog glass according to embodiments of the present disclosure. As shown in FIG. 2-5, the anti-fog glass 100 includes a glass body 11, an active anti-fog layer 12 and a passive anti-fog layer 13. The glass body 11 is a double-layered structure and comprises a first layer 111 and a second layer 112 stacked with each other. The first layer 111 comprises a first surface 1101 and a second surface 1102. The second layer 112 comprises a third surface 1103 and a fourth surface 1104. The second surface 1102 faces towards the third surface 1103. In the case that the anti-fog glass 100 is a vehicle glass (e.g., a windshield), the first surface 1101 may be the surface of the glass body 11 facing the exterior of the vehicle, and the fourth surface 1104 may be the surface of the glass body 11 facing the interior of the vehicle.

In some embodiments, the active anti-fog layer 12 may be disposed on at least one of the second surface 1102 and the third surface 1103, and the passive anti-fog layer 13 may be disposed on at least one of the first surface 1101 and the fourth surface 1104. The active anti-fog layer 12 includes at least one of a transparent conductive film, a silver printed wire, a heating patch, a heating plate, a copper wire and a tungsten wire and can heat up upon being powered. The heated active anti-fog layer 12 can raise the temperature of the first layer 111 and/or the second layer 112 of the glass body 11 to inhibit fog from forming on the glass body 11. In an example, the transparent conductive film may be a silver-based plating film, such as single/two/three silver layers. In another example, the transparent conductive film may be a transparent conductive oxide plating film, for example, it contains at least one of the following: indium tin oxide (ITO), aluminum zinc oxide (AZO), antimony tin oxide (ATO), indium zinc oxide (IZO), zinc gallium oxide (GZO), etc.

Figure 2:
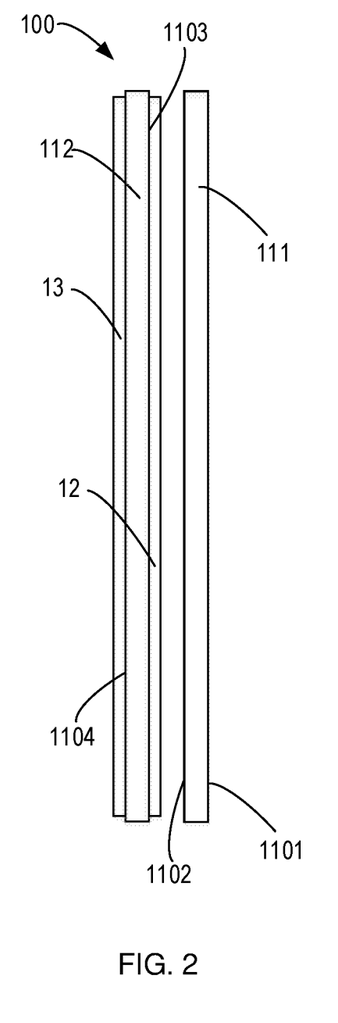
FIG. 2-5 illustrate a structural schematic diagram of a laminated anti-fog glass according to embodiments of the present disclosure.
Figure 3:
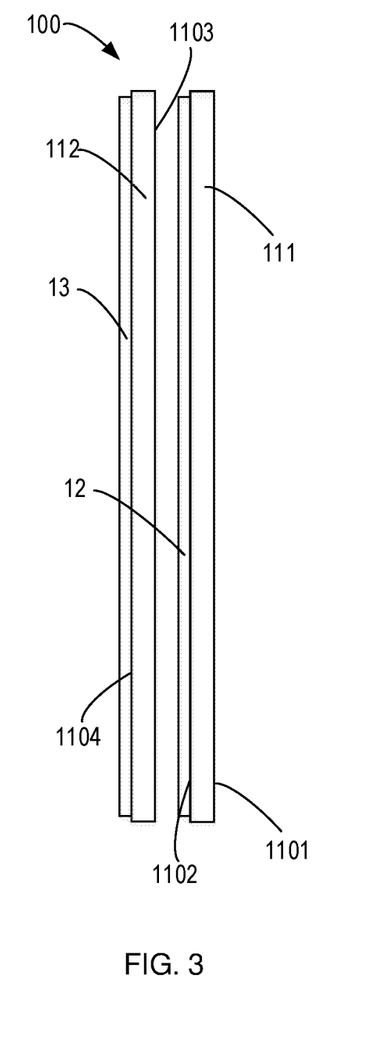
Figure 4:
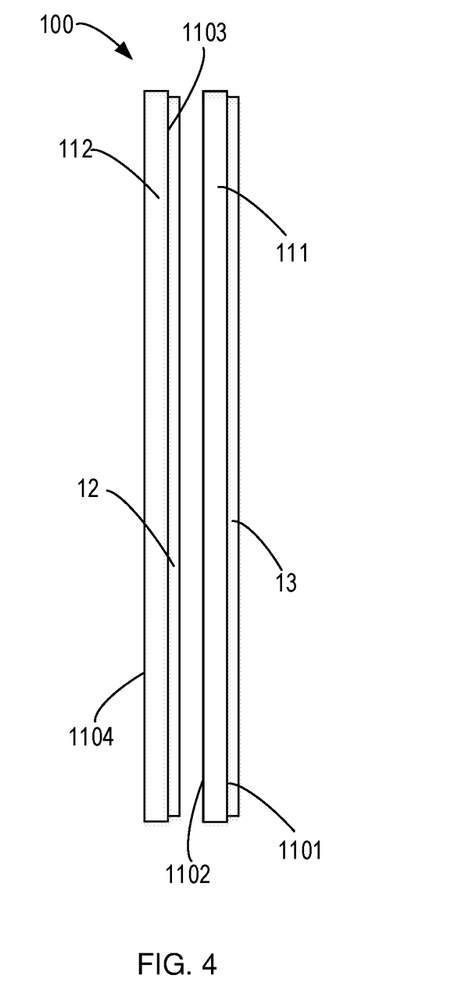

FIGS. 2-5 show some exemplary arrangements of the active anti-fog layer 12 and the passive anti-fog layer 13. As shown in FIG. 2, the active anti-fog layer 12 is disposed on the third surface 1103, and the passive anti-fog layer 13 is disposed on the fourth surface 1104. As shown in FIG. 3, the active anti-fog layer 12 is disposed on the second surface 1102, and the passive anti-fog layer 13 is disposed on the fourth surface 1104. As shown in FIG. 4, the active anti-fog layer 12 is disposed on the third surface 1103, and the passive anti-fog layer 13 is disposed on the first surface 1101.

Figure 5:
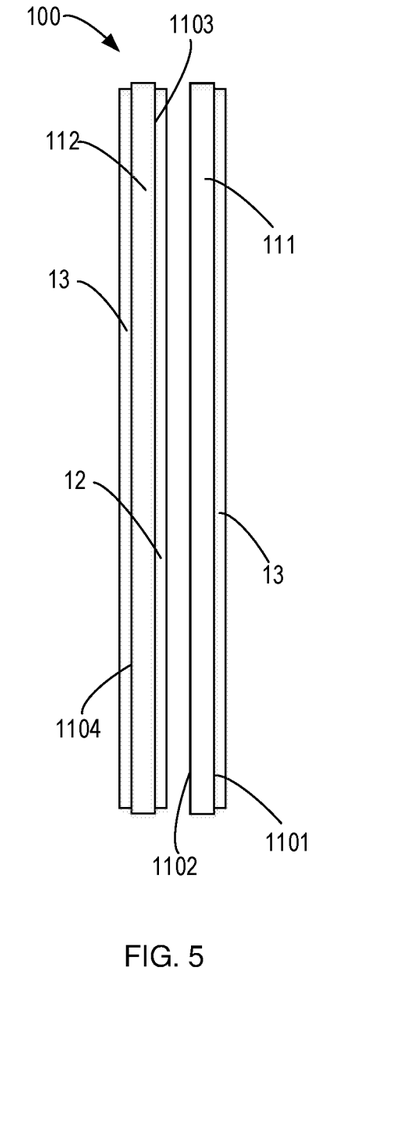

As shown in FIG. 5, the active anti-fog layer 12 is disposed on the third surface 1103, and the passive anti-fog layer 13 is disposed on the first surface 1101 and the fourth surface 1104.

In some embodiments, at least one surface of the glass body 11 may be provided with both the active anti-fog layer 12 and the passive anti-fog layer 13 at the same time. For example, the first surface 1101 and/or the fourth surface 1104 of the glass body 11 as shown in FIGS. 2-5 may be provided with the active anti-fog layer 12 and the passive anti-fog layer 13 at the same time. In an example, the active anti-fog layer 12 may be disposed around the passive anti-fog layer 13 to allow the infrared and radio signals to pass through the passive anti-fog layer 13. When the anti-fog glass 100 is used on the vehicle, the infrared and radio signals can pass through the passive anti-fog layer 13 without being interfered with or isolated by the active anti-fog layer 12, so that normal use of the following functions will not be affected: ETC, RFID, rain sensors, radios, infrared cameras, etc.

In other examples, the active anti-fog layer 12 and the passive anti-fog layer 13 may be formed on the first surface 1101 and/or the fourth surface 1104 of the glass body 11 in other arrangements. In addition, in the case that the active anti-fog layer 12 and the passive anti-fog layer 13 are formed on the first surface 1101 and/or the fourth surface 1104 of the glass body 11 at the same time, the active anti-fog layer 12 may be a silver printed line, to avoid being oxidized when being heated.

The super hydrophobic coating has a high contact angle, for example in a range of 120° to 180°. In addition, the super hydrophobic coating has low hysteresis, that is, a difference between an advancing angle and a receding angle of the water droplets on an inclined substrate is small. Therefore, the super hydrophobic coating can use repellence of the coating surface against the fog droplets to allow the fog droplets to gather into large water droplets which then automatically roll off the coating surface. In some embodiments, the super hydrophobic coating includes an inorganic oxide layer such as a silica layer, with a thickness of 0.1 μm to 20 μm. 30% to 90% of a volume of the inorganic oxide layer consists of pores with an aperture of 20 nm to 300 nm. The pores are evenly distributed throughout the thickness of the inorganic oxide layer, and almost all of the pores are in communication with each other. Inner and outer surfaces of the inorganic oxide layer are functionalized with a compound containing perfluoroalkyl or alkyl functional groups, and then saturated with a hydrophobic oil that impregnates the functionalized porous layer and forms a film on its surface. The hydrophobic oil may contain fluorinated oil or non-fluorinated silicone. It impregnates the porous silica layer and forms a film on its surface by virtue of its affinity (non-covalent bond) with compounds containing perfluoro-alkyl or alkyl functional groups (that is, compounds grafted to the surface of the pores) (This grafting modifies the surface tension of (internal and external) inorganic oxide layers). This results in a flat hydrophobic layer of liquid and/or semi-liquid semi-solid nature. With the hydrophobic oil impregnated into the porous layer, the porous layer may obtain the permanent retention of the hydrophobic oil.

The super hydrophobic coating is generally not scratch-resistant. Therefore, in a preferred embodiment, the super hydrophobic coating may be disposed on the inner surface of the single-layered anti-fog glass 100 as shown in FIG. 1 or the fourth surface 1104 of the laminated anti-fog glass 100 as shown in FIGS. 2-5. In addition, in the case that the hydrophilic coating needs be excited by ultraviolet light to play its hydrophilic role (for example, the hydrophilic coating contains titanium dioxide), the hydrophilic coating is preferably disposed on the outer surface of the single-layered anti-fog glass 100 or the first surface 1101 of the laminated anti-fog glass 100 as shown in FIGS. 2-5, because the amount of ultraviolet light reaching the inner surface of the single-layered anti-fog glass 100 or the fourth surface 1104 of the laminated anti-fog glass 100 will be reduced. In addition, in the case that the hydrophilic coating does not need be excited by the ultraviolet light to play the hydrophilic role, the hydrophilic coating may also be disposed on the inner surface of the single-layered anti-fog glass 100 or the fourth surface 1104 of the laminated anti-fog glass 100.

In some embodiments, the hydrophilic coating is formed by mixing dopamine, a hydrophilic polymer, inorganic oxide particles and a solvent. In some embodiments, a mass fraction of the dopamine in the hydrophilic coating is 1% to 20%, a mass fraction of the hydrophilic polymer is 10% to 45%, a mass fraction of the inorganic oxide particles is 40% to 80%, and a mass fraction of the solvent is 5% to 47%. In some embodiments, the solvent is water, an alcohol aqueous solution, or an oxidizing aqueous solution.

In some embodiments, the hydrophilic coating is formed by a coating dispersant coated on the glass body 11. The coating dispersant contains a dispersed phase and a dispersion medium. The dispersed phase includes a photocatalytic metal compound, particulate silica and a binder. Based on the total weight (i.e., the total weight of the dispersion phase in the coating dispersant) of the hydrophilic coating, the hydrophilic coating contains about 0.1-50 wt % photocatalytic metal compound, about 0-95 wt % particulate silica, and about 0-50 wt % binder. Preferably, based on the total weight of the hydrophilic coating, the hydrophilic coating may contain about 0.5-30 wt % photocatalytic metal compound, or about 60-80 wt % particulate silica, or about 5-30 wt % binder.

The photocatalytic metal compound is a metal compound with a photocatalytic capability. Under suitable irradiation, usually under ultraviolet irradiation, the photocatalytic metal compound can catalyze the degradation reaction of an organic compound. For example, such photocatalytic activity is induced inside the layer by generating an electron-hole pair, thereby facilitating causing organic pollutants adhered to the coating surface to decompose. In addition, the photocatalytic metal compound has good hydrophilicity, and can easily remove pollutants or decomposed pollutants by the washing of water such as rainwater.

The photocatalytic metal compound used herein includes photocatalytic metal sulfides, oxides or combinations thereof, including but not limited to zinc oxide, zirconium oxide, tin oxide, titanium dioxide, zinc sulfide, lead sulfide, or a combination thereof, preferably titanium dioxide.

Titanium dioxide typically includes rutile type and anatase type. The refractive index of the two crystal types of titanium dioxide are different. Herein, the anatase-type titanium dioxide is preferably used. In an embodiment, the content of the anatase-type titanium dioxide in the titanium dioxide is about more than 80 wt %, preferably about more than 90 wt %, and more preferably about more than 95 wt %.

The shape of the photocatalytic metal compound includes, but is not limited to, spherical shape, dodecahedron, hexahedron or irregular polyhedron, but it is necessary to make the photocatalytic metal compound particles have gaps between the particles when they accumulate in the coating to facilitate the incidence of sunlight and the resultant increase of visible light transmittance of the coating. The photocatalytic metal compound is preferably spherical. In the text herein, the particle size of the photocatalytic metal compound is about 10-100 nm. The preferred particle size helps to obtain a photocatalytic metal compound with a suitable total specific surface area, thereby facilitating obtaining a stable coating dispersant, facilitating the photocatalytic performance of the coating, and obtaining a coating with a suitable thickness and a suitable refractive index of the coating, so as to obtain a coating with higher visible light transmittance. An excessively high particle size of the photocatalytic metal compound will reduce the specific surface area, thereby reducing the photocatalytic performance, and meanwhile making the refractive index increase and the visible light transmittance decrease. An excessively low particle size of the photocatalytic metal compound will cause the particles prone to agglomerate. Preferably, a lower limit of the particle size of the photocatalytic metal compound is above about 12 nm, such as above 15 nm. Preferably, an upper limit of the particle size of the photocatalytic metal compound is preferably below about 60 nm, more preferably below 40 nm, for example, about 20 nm. The photocatalytic metal compound herein has a relatively centralized particle size distribution. In a preferred embodiment, the photocatalytic metal compound is monodisperse.

Silica has a high light transmittance, and thereby facilitates the reduction of the refractive index of the coating dispersant or the final coating obtained by the coating dispersant, and reduces adverse effects exerted by the relatively high refractive index of the photocatalytic metal compound on the light transmittance of the glass. At the same time, according to the hydrophilic coating provided by the present invention, $\Delta TE$ of the hydrophilic coating is above about 0.9. Such an increase in $\Delta TE$ is especially favorable for obtaining a substrate with both anti-fog ability as well as good coverage of transmission energy, where $\Delta TE$ is a difference in total transmission energy, that is, a total transmission energy value of the glass covered with the coating minus a total transmission energy value of the glass without being covered with the coating.

In an embodiment, the refractive index of the particulate silica is about 1.3-1.5, preferably about 1.4-1.5.

In the text herein, particulate silica refers to solid silica in particulate form.

The shape of the particulate silica includes but is not limited to spherical shape, dodecahedron, hexahedron or irregular polyhedron, but it is necessary to make the particulate silica have gaps between the particles when they accumulate in the coating to facilitate the incidence of sunlight. The particulate silica is preferably spherical. The particle size of the particulate silica is about 10-30 nm. The preferred particle size helps to obtain silica with a suitable total specific surface area, thereby facilitating obtaining a stable coating dispersant, and thereby obtaining a coating with good hydrophilicity, suitable thickness, refractive index, and air or void volume so that the obtained coating has high visible light transmittance. An excessively high particle size of the particulate silica will increase the refractive index of the obtained coating, reduce the air or void volume in the coating, and not facilitate the incidence of sunlight, thereby reducing the visible light transmittance. An excessively low particle size of the particulate silica will make the particles prone to agglomerate. A lower limit of the particle size of the particulate silica is preferably above about 12 nm, more preferably above about 15 nm. An upper limit of the particle size of the particulate silica is preferably below about 25 nm, and more preferably below about 20 nm. For example, the particle size is about 18 nm. The particulate silica herein has a relatively centralized particle size distribution. In a preferred embodiment, the silica is monodisperse.

The combination of the particulate silica and photocatalytic metal compound facilitates obtaining a coating obtained by the coating dispersant with good hydrophilicity, thereby facilitating maintaining the anti-fog ability of the coating for a long time. In an embodiment, a weight ratio of the particulate silica to the photocatalytic metal compound is about 3-500. A preferred weight ratio of the particulate silica to the photocatalytic metal compound is advantageous for obtaining a coating with excellent photocatalytic performance, anti-fog performance and optical characteristics such as higher visible light transmittance. An excessively low weight ratio will reduce the visible light transmittance of the obtained coating, and an excessively high weight ratio will reduce the photocatalytic performance of the coating. A lower limit of the preferred weight ratio of particulate silica to the photocatalytic metal compound is above about 4, preferably above about 5, and more preferably above about 6; an upper limit of the preferred weight ratio of particulate silica to the photocatalytic metal compound is below about 300, preferably below about 200, and more preferably below about 100. For example, the weight ratio is about 7, 15, 30, 45, or 90.

Herein, the binder is preferably a material having a relatively small refractive index or a relatively high light transmittance. In an embodiment, the binder is selected from sol-type silica, silane coupling agent, and a combination thereof. In a preferred embodiment, the sol-type silica is prepared from one or more selected from the group consisting of tetraethoxysilane (TEOS), sodium silicate, lithium silicate, and potassium silicate. In another preferred embodiment, the silane coupling agent is prepared by organic silicate precursors having the following general formula or a combination thereof: R2nSi(OR1)4−n;

In the formula, n is an integer of 0-2, for example, 0, 1, 2, 3, 4. R1 is a CXH2X+1 type alkyl functional group, and R2 is an organic group containing, for example, alkyl, epoxy, acrylate, methacrylate, amine, phenyl or vinyl functional group, where x is an integer of 1-20, e.g., 1, 3, 5, 7, 9, 11, 13, 15, 17 or 19. The alkyl group is typically an alkyl group of 1-20 carbon atoms.

In a more preferred embodiment, the binder is a silica sol prepared from tetraethoxysilane.

In another embodiment, a ratio of a total weight of the particulate silica and the photocatalytic metal compound to a weight of the binder is about 1-19. A preferred ratio of the particulate silica, photocatalytic metal compound and binder is advantageous for forming a coating with a good adhesion capability. Preferably, a lower limit of the preferred ratio of the total weight of the particulate silica and the photocatalytic metal compound to the weight of the binder is above about 2, preferably above about 3, and more preferably above about 5. An upper limit of the preferred ratio of the total weight of the particulate silica and the photocatalytic metal compound to the weight of the binder is below about 17, preferably below about 15, and more preferably below about 12. For example, the ratio is about 4 or 9. For example, the ratio is about 4 or 10.

The coating dispersant herein is preferably an aqueous coating dispersant. A dispersion medium in the coating dispersant is preferably an aqueous solution, a solution containing water, or water. The aqueous solution refers to a solution with water as the main dispersion medium. In an embodiment, the dispersion medium of the present invention is an acidic aqueous solution, preferably an inorganic acid aqueous solution. The inorganic acid includes, but not limited to, hydrochloric acid, sulfuric acid, and nitric acid.

In an embodiment, the pH of the coating dispersant is about 1-7. A preferred pH of the coating dispersant facilitates forming a coating dispersant solution with good stability. A lower limit of the preferred pH is above about 1.5. An upper limit of the preferred pH is below about 5. For example, the pH is 2.

In some embodiments, since the photocatalytic/hydrophilic properties of the photocatalytic metal compound (such as titanium dioxide) in the hydrophilic coating need to be excited by ultraviolet conditions and the super hydrophobic coating is generally not resistant to friction, the passive anti-fog layer 13 provided on the first surface 1101 as shown in FIG. 5 may be a hydrophilic coating, and the passive anti-fog layer 13 provided on the fourth surface 1104 may be a super hydrophobic coating. In addition, the hydrophilic coating has good resistance against abrasion, and may be available for the first surface 1101 with more severe conditions.

In some other embodiments, for the hydrophilic coating that does not require photocatalysis, it may be used on the fourth surface 1104 of the glass body 11, because fog is more likely to occur on the inner surface of the windshield, namely, the fourth surface 1104 of the glass body 11.

In some embodiments, the passive anti-fog layer 13 is formed on the glass body 11 through at least one of: spray, wet coating, roller coating, slit coating, embossing, knife coating, impregnation, curtain coating, reverse roll coating, gravure coating, dip coating, and wire coating. In other embodiments, the passive anti-fog layer 13 may also be formed on the glass body 11 in other available ways. The scope of the present disclosure is not limited in this respect.

Figure 6:
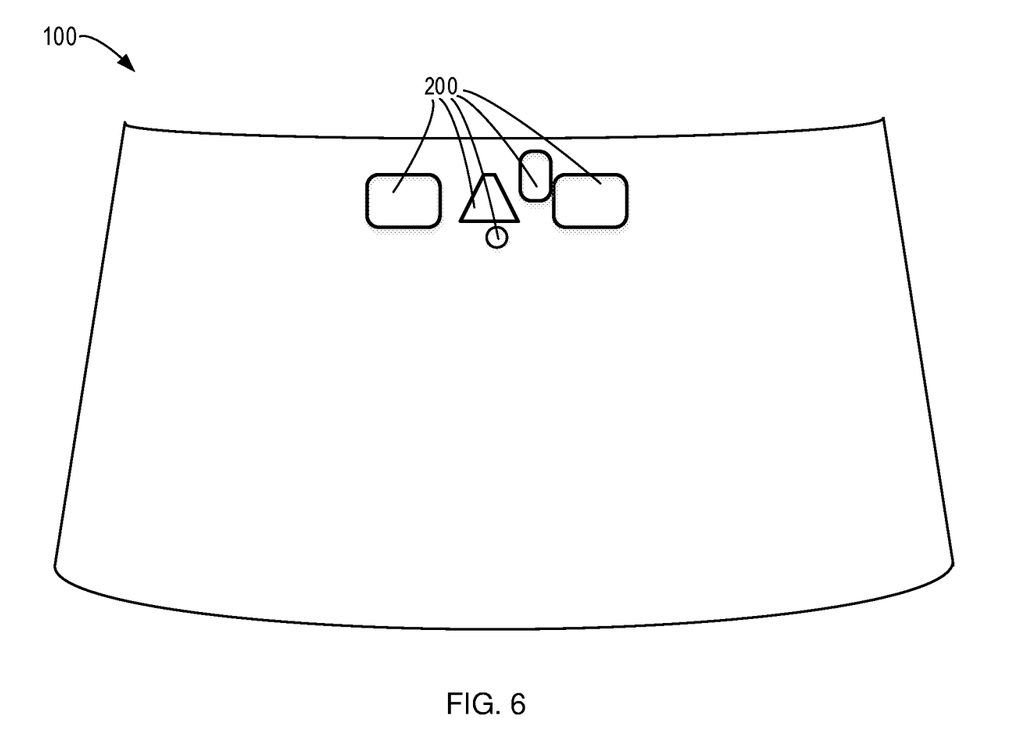
FIG. 6 illustrates a structural schematic diagram of a vehicle windshield according to an embodiment of the present disclosure.

FIG. 6 illustrates a structural schematic diagram of a vehicle windshield according to an embodiment of the present disclosure. The vehicle windshield as shown in FIG. 6 may be the anti-fog glass 100 described with reference to FIGS. 1-5. Since the active anti-fog layer 12 is made of a metal or conductive oxide, the active anti-fog layer 12 will interfere with or isolate the infrared and radio signals, thereby affecting the normal use of the following functions: ETC, RFID, rain sensors, radios, infrared cameras, etc. To solve this problem, as shown in FIG. 6, the surface of the glass body 11 of the windshield 100 on which the active anti-fog layer 12 is provided includes an area 200 where the active anti-fog layer 12 is not formed, to allow the infrared and radio signals, etc. to pass therethrough. In addition, the passive anti-fog layer 13 should be large enough to cover the area corresponding to the sensor used by ADAS. In an embodiment according to the present disclosure, the passive anti-fog layer 13 may cover all or part of the corresponding surface of the glass body 11.

In the embodiments according to the present disclosure, both the active anti-fog layer 12 and the passive anti-fog layer 13 are simultaneously disposed on the glass body 11 to inhibit fog from forming. In this way, in a region of the glass body 11 not covered by the active anti-fog layer 12, the anti-fog function may be achieved by disposing the passive anti-fog layer 13 to a certain degree; in addition, in a region where the passive anti-fog layer 13 on the glass body 11 itself cannot provide a desired anti-fog level, the active anti-fog layer 12 together with the passive anti-fog layer 13 can provide a better anti-fog effect.

Figure 7:
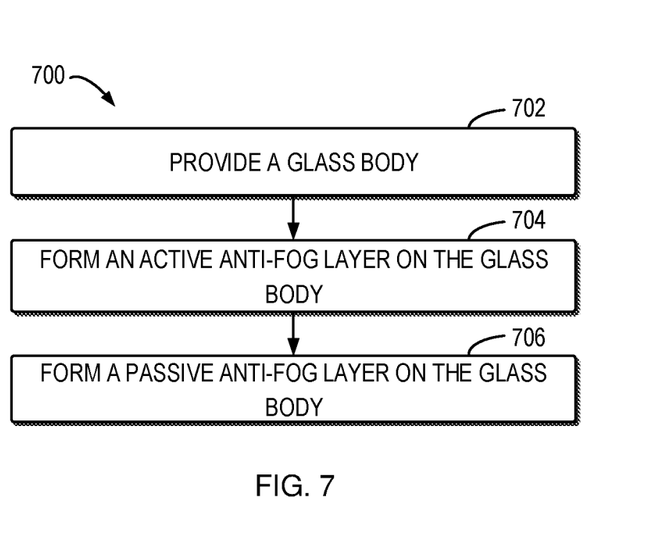
FIG. 7 illustrates a flow chart of a method of manufacturing the anti-fog glass according to an embodiment of the present disclosure.

FIG. 7 illustrates a flow chart of a method of manufacturing the anti-fog glass according to an embodiment of the present disclosure. As shown in FIG. 7, the method 700 includes: at 702, providing a glass body being configured as a single layer or a multilayer stack; at 704, forming an active anti-fog layer on the glass body, the active anti-fog layer is configured to heat up when being provided with power; and at 706, forming a passive anti-fog layer on the glass body, the passive anti-fog layer is configured to inhibit fog from forming on the passive anti-fog layer, wherein the passive anti-fog layer is a super hydrophobic coating and/or a hydrophilic coating.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An anti-fog glass comprising:
    a glass body that is configured as a single layer or a multilayer stack;
    an active anti-fog layer that is disposed on the glass body and configured to heat up when being provided with power; and
    a passive anti-fog layer that is disposed on the glass body and configured to inhibit fog from forming on the passive anti-fog layer, wherein the passive anti-fog layer is a super hydrophobic coating.

2. The anti-fog glass according to claim 1, wherein the active anti-fog layer is disposed on at least one surface of the glass body, and the passive anti-fog layer is disposed on at least one other surface of the glass body except for the at least one surface.

3. The anti-fog glass according to claim 2, wherein the glass body comprises a first layer and a second layer stacked with each other, the first layer comprises a first surface and a second surface, the second layer comprises a third surface and a fourth surface, and the second surface faces towards the third surface;
    wherein the active anti-fog layer is disposed on at least one of the second and third surfaces; and
    wherein the passive anti-fog layer is disposed on the fourth surface, the first surface forming an outer surface of the anti-fog glass configured to face an exterior of a vehicle or a building and the fourth surface forming an inner surface of the anti-fog glass configured to face an interior of the vehicle or the building.

4. The anti-fog glass according to claim 3, further comprising another passive anti-fog layer that includes a hydrophilic coating on the first surface and the fourth surface is provided with the super hydrophobic coating.

5. The anti-fog glass according to claim 4, wherein based on the total weight of the hydrophilic coating, the hydrophilic coating contains:
    0.1-50 wt % photocatalytic metal compound;
    0-95 wt % particulate silica; and
    0-50 wt % binder,
    wherein the photocatalytic metal compound comprises a photocatalytic metal sulfide, a photocatalytic metal oxide or a combination thereof.

6. The anti-fog glass according to claim 5, wherein the photocatalytic metal compound is zinc oxide, zirconium oxide, tin oxide, titanium dioxide, zinc sulfide, lead sulfide, or a combination thereof.

7. The anti-fog glass according to claim 5, where a particle size of the photocatalytic metal compound is 10-100 nm.

8. The anti-fog glass according to claim 5, wherein the hydrophilic coating contains particulate silica having a particle size of 10-30 nm.

9. The anti-fog glass according to claim 5, wherein the hydrophilic coating contains said binder and the binder is one or more selected from sol silica and silane coupling agent;
    the sol silica contains one or more of tetraethoxysilane, sodium silicate, lithium silicate, and potassium silicate;
    the silane coupling agent is prepared by one or more organic silicate precursors having the following formula:
    $R2nSi(OR1)4-n$;
    wherein n is an integer of 0-2, R1 is a $CXH2X+1$ alkyl functional group, and R2 is an organic group containing alkyl, epoxy, acrylate, methacrylate, amine, phenyl or vinyl functional group.

10. The anti-fog glass according to claim 5, wherein the hydrophilic coating is formed by a coating dispersant coated on the glass body, and wherein the coating dispersant further comprises a dispersion medium, and the dispersion medium is an aqueous solution, a solution containing water, or water; and/or
    the pH of the coating dispersant is 1-7.

11. The anti-fog glass according to claim 2, wherein the active anti-fog layer comprises at least one of: a transparent conductive film, a silver printed wire, a heating patch, a heating plate, a copper wire and a tungsten wire.

12. The anti-fog glass according to claim 1, wherein at least one surface of the glass body comprises a region where the active anti-fog layer is not formed, so as to allow infrared and radio signals to pass therethrough.

13. The anti-fog glass according to claim 1, wherein at least one surface of the glass body is provided with both the active anti-fog layer and the passive anti-fog layer.

14. The anti-fog glass according to claim 13, wherein the active anti-fog layer is disposed around the passive anti-fog layer on the at least one surface to allow infrared and radio signals to pass through the passive anti-fog layer.

15. The anti-fog glass according to claim 14, wherein the glass body comprises a first layer and a second layer stacked with each other, the first layer comprises a first surface and a second surface, the second layer comprises a third surface and a fourth surface, and the second surface faces towards the third surface; and
    wherein the first surface and/or the fourth surface is provided with both the active anti-fog layer and the passive anti-fog layer, the first surface forming an outer surface of the anti-fog glass configured to face an exterior of a vehicle or a building and the fourth surface forming an inner surface of the anti-fog glass configured to face an interior of the vehicle or the building.

16. The anti-fog glass according to claim 15, wherein the active anti-fog layer is a silver printed wire.

17. The anti-fog glass according to claim 1, wherein the super hydrophobic coating comprises an inorganic oxide layer with a thickness of 0.1 µm to 20 µm, 30% to 90% of a volume of the inorganic oxide layer consists of pores with an aperture of 20 nm to 300 nm, the pores are evenly distributed throughout the thickness of the inorganic oxide layer, and almost all of the pores are in communication with each other, and inner and outer surfaces of the inorganic oxide layer are functionalized with a compound containing perfluoroalkyl or alkyl functional groups, and then saturated with a hydrophobic oil that impregnates the functionalized porous layer and forms a film on its surface.

18. The anti-fog glass according to claim 1, wherein the passive anti-fog layer is formed onto the glass body through at least one of: spray, wet coating, roller coating, slit coating, embossing, knife coating, impregnation, curtain coating, reverse roll coating, gravure coating, dip coating, and wire coating.

19. The anti-fog glass according to claim 1, wherein the anti-fog glass is a glass for a vehicle.

20. A vehicle comprising the anti-fog glass according to claim 1.

21. A method of manufacturing an anti-fog glass, comprising:
   providing a glass body being configured as a single layer or a multilayer stack;
   forming an active anti-fog layer on the glass body, the active anti-fog layer is configured to heat up when being provided with power; and
   forming a passive anti-fog layer on the glass body, the passive anti-fog layer is configured to inhibit fog from forming on the passive anti-fog layer, wherein the passive anti-fog layer is a super hydrophobic coating.

22. The anti-fog glass according to claim 1, wherein the passive anti-fog layer is provided on an inner surface of the glass body that is configured to face an interior of a vehicle or a building.

* * * * *